United States Patent Office 3,429,922
Patented Feb. 25, 1969

3,429,922
PHENYLISOPROPYLAMINES AND THE SALTS THEREOF
Laszlo Beregi, Boulogne-sur-Seine, Pierre Hugon, Rueil-Malmaison, and Jean-Claude Le Douarec, Suresnes, France, assignors to Science Union et cie, Societe Francaise de Recherche Medicale, Suresnes, France, a French society
No Drawing. Filed Dec. 20, 1965, Ser. No. 515,226
Claims priority, application Great Britain, Jan. 5, 1965, 459/65
U.S. Cl. 260—570.8  16 Claims
Int. Cl. C07c 87/28; A61k 27/00

ABSTRACT OF THE DISCLOSURE

Phenylisopropylamines wherein the phenyl group contains a halogen or trifluoromethyl substituent and wherein the amine group has the formula —NHR, wherein R is an unsaturated hydrocarbon radical containing three to eight carbon atoms, inclusive, and acid addition salts thereof. Useful as analgesics, anorexigenics, hypotensives, and metabolism and central nervous system activity regulators.

---

The present invention provides new phenylisopropylamine derivatives of the following formula:

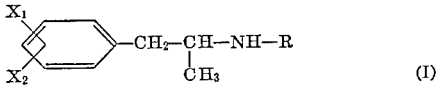

(I)

wherein $X_1$ and $X_2$ represent a hydrogen atom or a halogen atom, for example, a chlorine, fluorine or bromine atom, or a halogenomethyl group, for example a trifluoromethyl group, at least one of them being other than hydrogen. The substituents $X_1$ and $X_2$ can be in any of the available positions of the phenyl nucleus and, when two substituents are present, they may be the same or different. R represents an unsaturated aliphatic hydrocarbon radical containing from 3 to 8 carbon atoms such, for example, as allyl (—CH₂—CH=CH₂), methylallyl

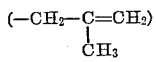

butenyl (—CH₂CH=CHCH₃), propargyl (—CH₂C≡CH)

and 3-butynyl (—CH₂CH₂C≡CH).

The present invention also includes acid addition salts of the above compounds obtainable by reaction with organic or inorganic acids yielding physiologically tolerable salts with such compounds as, for example, hydrohalic acids such, for example, as hydrochloric, hydrobromic or hydroiodic acid, sulphuric, nitric, phosphoric, acetic, propionic, glycolic, pyruvic, oxalic, lactic, malonic, maleic, fumaric, succinic, malic, tartaric, citric, benzoic, mandelic, cinnamic, salicylic, methanesulphonic or ethanesulphonic acid.

The compounds of this invention and their physiologically tolerable acid addition salts possess a surprising level of valuable and remarkably diverse pharmacological activities such, for example, as analgesic without addition, a general appeasing activity of the central nervous system without side effects, anorexigenic, hypotensive activity, and increasing and regulating activity on lipid and glucid metabolism and monoamine oxydase inhibitor activity.

Their low toxicity and high therapeutic index render these compounds valuable therapeutic agents, especially useful as analgesics, anorexigencis, metabolism and central nervous system activity regulators and hypotensives.

The invention also provides a process for the manufacture of the compounds of the above general formula, wherein a substituted phenylisopropylamine of the Formula II:

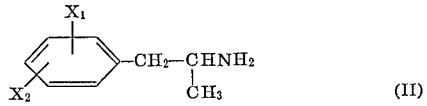

(II)

wherein $X_1$ and $X_2$ have the previously indicated meanings, is refluxed with a haloalkene, or a haloalkyne, containing from 3 to 8 C atoms, in an inert solvent such, for example, as benzene, toluene, dimethyl formamide or carbon tetrachloride, in the presence or absence of a hydrohalic acid acceptor such, for example, as triethylamine, pyridine or potassium carbonate.

The optical isomers of the compounds of the invention may be prepared either from the corresponding $d$ or $l$-phenylisopropylamine or by the resolution, by means of optically active acids, of the $dl$-secondary amines of this invention.

The following examples illustrate the invention, the parts being by weight unless otherwise stated:

Example 1.—N-(2-propyne 1-yl)-β-(m-trifluoromethylphenyl)isopropylamine

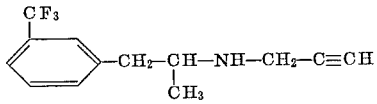

61.5 parts of β-(m-trifluoromethylphenyl)isopropylamine and 18 parts of propargyl bromide in 250 parts of anhydrous toluene were refluxed for 2 hours. After cooling, 250 parts of water were added and the mixture throughly shaken. The organic layer was dried over anhydrous magnesium sulphate and concentrated in vacuo. Upon distillation of the residue under reduced pressure, there were obtained 21 parts of N-(2-propyne 1-yl)-β-(m-trifluoromethylphenyl)isopropylamine boiling at 78–80° C. at 1 millimeter pressure. $n_D^{25}$ 1.4692. The hydrochloride, after one recrystallisation from anhydrous ethanol, melts at 193–195° C. (with sublimation).

In a similar fashion, there were prepared the following derivatives:

(a) N - (2-propyne 1-yl)-β-(p-fluorophenyl)isopropylamine boiling at 90–92° C. at 15 millimeters pressure. $n_D^{25}$ 1.4955. The hydrochloride melts at 202–203° C. (acetoneethanol).

(b) N-(2-propyne 1-yl)-β-(3,4-dichlorophenyl)isopropylamine boiling at 128–131° C. at 1 millimeter pressure. $n_D^{25}$ 1.5479. The hydrochloride melts at 223° C. (ethyl alcohol).

(c) N-(2-propyne 1-yl)-β-(2-trifluoromethyl 4-fluorophenyl)isopropylamine.

(d) N-(2-propyne 1-yl)-β - (3,5 - bis trifluoromethylphenyl)isopropylamine boiling at 112–118° C. at 18 mm. pressure. $n_D^{25}$ 1.4359. The hydrochloride melts at 229–230° C. (with sublimation (isopropanol)).

Example 2.—d-N-(2-propyne 1-yl)-β-(m-trifluoromethylphenyl)isopropylamine 172 parts of racemic N-(2-propyne 1-yl)-β-(m-trifluoromethylphenyl)isopropylamine are boiled in a solution of 352 parts of dibenzoyl $d$-tartaric acid in 2600 parts of absolute ethyl alcohol at reflux for 10 minutes. After return to room temperature, the precipitate obtained is dried, washed with 100 parts of ethyl alcohol and then air-dried. 153 parts of dibenzoyl $d$-tartrate are obtained; by concentration of the mother liquor to one-half volume and cooling for a few hours, a second precipitate (39 parts) of dibenzoyl $d$-tartrate is obtained. The filtrate is concentrated in vacuo, treated with 700 parts of water and 260 parts of caustic soda lye, then extracted with three 200-part portions of ether. After drying, the solvent is evaporated and the residue is distilled. 83 parts of base are obtained, boiling at 125–127° C. at 20 millimeters pressure. $[\alpha]_D^{23}$ −6.9° (c. 16/ethyl alcohol).

The two portions of dibenzoyl d-tartrate are recrystalised twice in 1200 parts of absolute ethyl alcohol. 140 parts of pure dibenzoyl d-tartrate are finally obtained and placed in suspension in 300 parts of water; after alkalinisation with 100 parts of caustic soda lye and extraction with ether, then drying, the organic layer is dried and the solvent evaporated in vacuo. By distillation of the residue, 45 parts of d-N-(2-propyne 1-yl)-β-(m-trifluoromethylphenyl)isopropylamine are obtained, boiling at 119° C. at 13 millimeter pressure. $n_D^{25}$ 1.4697, $[\alpha]_D^{23}$ +7.9° (c. 16/ethyl alcohol). The hydrochloride melts at 154° C. (recrystallisation in ethyl acetate) $[\alpha]_D^{23}$ −7.9° (c. 16/water).

Example 3.—l-N-(2-propyne 1-yl)-β-(m-trifluoromethylphenyl)isopropylamine 15 parts of the base $[\alpha]_D^{23}$(−6.9 (c. 16/ethyl alcohol)), recovered from the mother liquor of the here-above separation, in solution in 10 parts of ethyl acetate, are poured in a solution at reflux of 15.8 parts of d-camphosulfonic acid in 72 parts of ethyl acetate. After return at the ambient temperature, the precipitate obtained is dried, washed with 10 parts of solvent, and then air-dried. 25 parts of d-camphosulfonate are obtained, melting at 170–171° C.

After recrystallisation from 450 parts of ethyl acetate and 13 parts of absolute ethyl alcohol, 22 parts of pure d-camphosulfonate are obtained (melting at 170–171° C.) and placed in suspension in 100 parts of water: after alkalinisation and extraction with ether, the organic layer is dried and the solvent evaporated. When the residue is distilled, 10 parts of l-N-(2-propyne 1-yl)-β(m-trifluoromethylphenyl)isopropylamine are obtained, boiling at 124–125° C. at 15 millimeters pressure. $n_D^{25}$ 1.4698 $[\alpha]_D^{23}$ −8° (c. 16/ethyl alcohol). The hydrochloride melts at 154° C. at 23 millimeters pressure (recrystallisation from ethyl acetate). $[\alpha]_D^{23}$ +8° (c. 16/water).

Example 4.—N-(2-propene 1-yl)-β-(m-trifluoromethylphenyl)isopropylamine

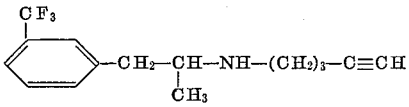

By substituting propargyl bromide by allyl bromide in the process of Example 1, there was obtained N-(2-propene 1 - yl) - β-(m-trifluoromethylphenyl)isopropylamine, boiling at 111–112° C. at 11 mm. pressure. $n_D^{25}$ 1.4636. The hydrochloride, after one recrystallisation from ethyl acetate, melts at 170° C.

In a similar fashion, the following derivatives were prepared:

(a) From the d form of β-(m-trifluoromethylphenyl) isopropylamine. d - N - (2-propene 1-yl)-β-(m-trifluoromethylphenyl)isopropylamine boiling at 123–124° C. at 25 mm. pressure. $n_D^{25}$ 1.4624 $[\alpha]_D^{23}$ +11.9 (c. 16/ethyl alcohol). The hydrochloride, after recrystallisation from ethyl acetate, melts at 157° C.; $[\alpha]_D^{23}$ +7° (c. 16/ethyl alcohol).

(b) From the l form of β-(m-trifluoromethylphenyl) isopropylamine. l-N-(2-propene 1-yl)-β-(m-trifluoromethylphenyl)isopropylamine boiling at 120° C. at 18 mm. pressure. $n_D^{25}$ 1.4622 $[\alpha]_D^{23}$ −12° (c. 16/ethyl alcohol). The hydrochloride, after recrystallisation from ethyl acetate, melts at 157° C. $[\alpha]_D^{23}$ −6.90 (c. 16/ethyl alcohol).

(c) N - (2-butene 1-yl)-β-(m-trifluoromethylphenyl) isopropylamine by substituting crotylbromide for allyl bromide, boiling at 127–129° C. at 19 mm. pressure. $n_D^{25}$ 1.4658. The hydrochloride melts at 192° C. (ethyl alcohol).

(d) N - (2 - methyl 2-propene 1 - yl)-β-(m-trifluoromethyl)isopropylamine by substituting methally chloride for allyl bromide, boiling at 128–129° C. at 19 mm. pressure. $n_D^{25}$ 1.4627. The hydrochloride melts at 172–174° C. (ethyl allyl).

(e) N-(3-methyl 2-butene 1-yl)-β-(m-trifluoromethylphenyl)isopropylamine from 1-bromo 3-methyl 2-butene, prepared according to Staudinger-Kries-Schilt (Helv. Chim. Acta 5, 743 (1922)).

(f) N - (2 - propene 1-yl)-β-(3,4-dichlorophenyl)isopropylamine, boiling at 105–108° C. at 0.4 mm. pressure. $n_D^{25}$ 1.5362. The hydrochloride melts at 218–219° C. (ethyl alcohol)

Example 5.—N-(4-pentyne 1-yl)-β-(m-trifluoromethyl isopropylamine

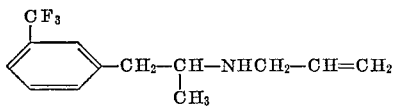

40.6 parts of β-(m-trifluoromethylphenyl)isopropylamine and 19.4 parts of 1-iodo 4-pentyne in 200 parts of anhydrous toluene are refluxed for 3½ hours; after cooling it was treated as in Example 1. Eight parts of N - (4-pentyne 1-yl)-β-(m-trifluoromethylphenyl)isopropylamine are obtained, boiling at 105–108° C. at 1.5 mm. pressure, $n_D^{25}$ 1.4710. The hydrochloride after two crystallisations in ethyl acetate melts at 129–131° C.

1-iodo 4-pentyne was prepared from 4-pentyne 1-ol by the method of Eglington-Whiting, J. Chem. Soc. 1950, 3653 using the corresponding tosylate as intermediate.

The new phenylisopropylamine derivatives of this invention and their addition salts possess valuable pharmacological and therapeutic properties and may be used as medicaments, especially as analgesic, anorexigenic, sedative and hypertensive agents, as lipid and glucid metabolism regulators and as inhibitors of monoamine oxydase.

Their $LD_{50}$ is from 75 to 283 mg./kg. in mice when administered intraperitoneally.

The analgesic activity in mice was demonstrated by Haffner's method. Administered intraperitoneally, the active dose is situated between 20 to 30 mg./kg. for the different derivatives of the invention.

The anorexigenic action was studied in the rat and it was found that the new derivatives, when administered orally at a dose of 5 to 15 mg./kg., reduce the taking of food of animals by 50% in the two hours following the treatment.

The derivatives of the invention have a depressing action on the central nervous system which manifests itself in a diminution of the spontaneous motor activity in mice and rat at doses from 5 to 20 mg./kg.

Some derivatives have an important antihypertensive action demonstrated when administered subcutaneous at doses varying from 2 to 5 mg./kg. per day for 15 days in rat with artificial hypertension and by oral administration at the same dose and for the same time in dogs rendered hypertensive by Goldblatts's method.

There was also noted that some derivatives of the invention have a considerable inhibitor activity on the MAO. Studied in vitro according to Warburg's method, an inhibition of 79.5% with a concentration of $2.10^{-4}$ and of 69.2% with concentration of $10^{-6}$ is shown for some of these new derivatives.

This activity is also important in vivo and is observed in rat after administration, for 4 days, of 25 mg./kg. of the compounds, at 71.8% in the liver and at 65% in the brain of the animals by comparison with those untreated.

The activity on lipid metabolism was observed in determining the free fatty acids (FFA) in plasma and by the diminuation of epididymal fat in the animals treated.

There was observed that some derivatives of the invention, administered intraperitoneally at a dose of 5 mg./ kg., induce in the rat an increase of plasmatic non-esterified fatty acids going up to 63.2% in comparison with the untreated animals. These compounds administered for 10 days at a dose of 10 to 25 mg./kg. per day to rats induce a noticeable reduction of epididymal fat going up to 32% in comparison with the untreated animals.

Regarding glucid metabolism, although the compounds of the invention do not seem to have a noticeable hypoglycemic action, there was observed a slight improvement of peripheral assimilation of glucose, determined by the coefficient K of V. Conard.

What we claim is:
1. A compound selected from the group consisting of:
  (a) phenylisopropylamine derivatives of the general formula:

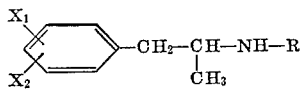

wherein $X_1$ and $X_2$ individually represent a substituent selected from the group consisting of hydrogen, halogen, and trifluoromethyl, at least one substituent being other than hydrogen, wherein R represents an unsaturated aliphatic hydrocarbon radical containing 3 to 8 carbon atoms, and dextrorotary and levorotary optical isomers thereof, and
  (b) therapeutically acceptable mineral and organic acid salts thereof.

2. A compound of claim 1 which is N-(2-propyne 1-yl)-β-(m-trifluoromethylphenyl)isopropylamine.

3. A compound of claim 1 which is N-(2-propyne 1-yl)-β-(p-fluorophenyl)isopropylamine.

4. A compound of claim 1 which is N-(2-propyne 1-yl)-β-(3,4-dichlorophenyl)isopropylamine.

5. A compound of claim 1 which is N-(2-propyne 1-yl)-β-(2-trifluoromethyl-4-fluorophenyl)isopropylamine.

6. A compound of claim 1 which is N-(2-propyne 1-yl)-β-(3,5-bis-trifluoromethylphenyl)isopropylamine.

7. A compound of claim 1 which is d-N-(2-propyne 1-yl)-β-(m-trifluoromethylphenyl)isopropylamine.

8. A compound of claim 1 which is l-N-(2-propyne 1-yl)-β-(m-trifluoromethylphenyl)isopropylamine.

9. A compound of claim 1 which is N-(2-propene 1-yl)-β-(m-trifluoromethylphenyl)isopropylamine.

10. A compound of claim 1 which is d-N-(2-propene 1-yl)-β-(m-trifluoromethylphenyl)isopropylamine.

11. A compound of claim 1 which is l-N-(2-propene 1-yl)-β-(m-trifluoromethylphenyl)isopropylamine.

12. A compound of claim 1 which is N-(2-butene 1-yl)-β-(m-trifluoromethylphenyl)isopropylamine.

13. A compound of claim 1 which is N-(2-methylpropene 1-yl)-β-(m-trifluoromethylphenyl)isopropylamine.

14. A compound of claim 1 which is N-(3-methyl 2-butene 1-yl) - β - (m - trifluoromethylphenyl)isopropylamine.

15. A compound of claim 1 which is N-(2-propene 1-yl)-β-(3,4-dichlorophenyl)isopropylamine.

16. A compound of claim 1 which is N-(4-pentyne 1-yl)-β-(m-trifluoromethylphenyl)isopropylamine.

References Cited

UNITED STATES PATENTS

| | | | |
|---|---|---|---|
| 2,884,455 | 4/1959 | Robertson et al. | 260—570.8 |
| 3,198,833 | 8/1965 | Beregi et al. | 260—570.8 |

FOREIGN PATENTS

| | | |
|---|---|---|
| 2,635 | 6/1964 | France. |

OTHER REFERENCES

Holland et al.: "Jour. Med. Chem.," vol. 6, No. 5, pages 519–24 (1963).

CHARLES B. PARKER, Primary Examiner.

ROBERT V. HINES, Assistant Examiner.

U.S. Cl. X.R.

260—456, 654, 657, 501.1, 501.21, 999